United States Patent Office 2,817,027
Patented Dec. 17, 1957

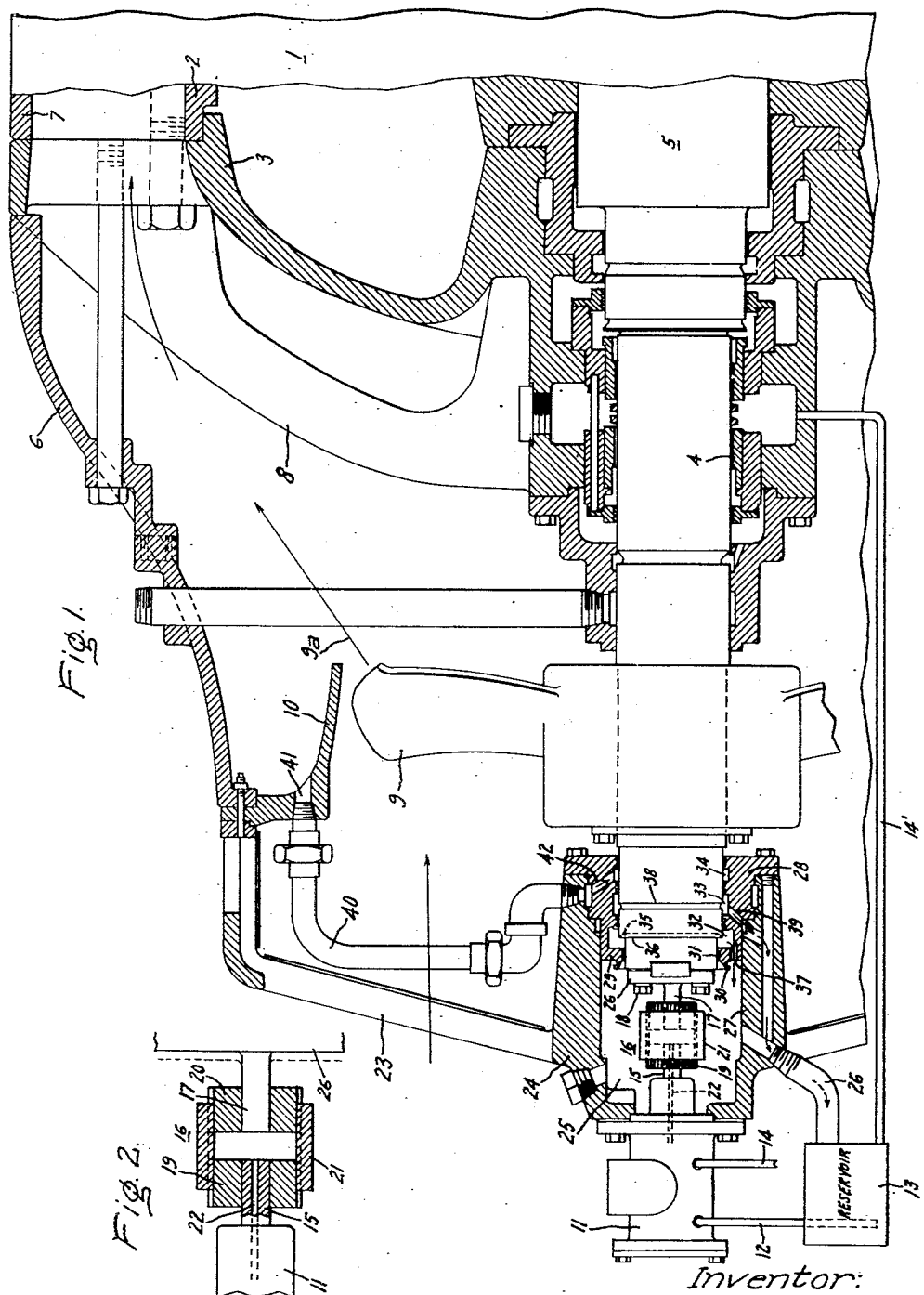

2,817,027

INTEGRAL FORCED LUBRICATING PUMP ASSEMBLY FOR TOTALLY ENCLOSED FAN COOLED MOTORS

Vincent J. Picozzi, Schenectady, N. Y., assignor to General Electric Company, a corporation of New York Application November 25, 1955, Serial No. 549,060

4 Claims. (Cl. 310—90)

This invention relates to totally enclosed fan cooled dynamo-electric machines and has its object the provision of a shaft driven lubricant pump assembly driven through a coupling which permits axial movement of the rotor shaft without imposing end thrust on the pump.

In dynamoelectric machines, such as large totally enclosed fan-cooled motors having bearings operating at relatively high speeds between the mating surfaces of the rotating and the non-rotating bearing elements, it is necessary to provide some means to force feed lubricant into the bearings for lubrication purposes. Moreover, because of the high relative surface speeds between the mating bearing surfaces, the heat developed by the shear losses in the oil between the bearing surfaces may be sufficiently great so that all the heat cannot be removed from the bearing through radiation. Accordingly, sufficient oil must be passed through the bearing to carry away the excess heat.

In the past, force feed lubricant pumps required in such machines have been supplied as a separate component driven by a small auxiliary motor. Because such an arrangement requires additional space for mounting and generally requires a different voltage supply than the main motor, the use of a directly connected pump driven by the main motor has obvious advantages. However, such a directly connected pump must be positioned at the fan end of the motor and spaced axially outward from the external cooling fan for the machine.

Prior to this invention, this has not been possible because of the necessity for providing a suitable coupling at the fan end of the machine through which end thrust would not be transmitted from the rotor of the machine to the pump. When the circuit to the motor is closed for starting, the rotor may move axially an appreciable amount due to the non-alignment of the magnetic centers of the rotor and the stator when the machine is at rest and also due to varying armature and field currents during operation and at standstill. Moreover, the axial force imposed on the fan by the air which is being pumped will cause axial movement of the rotor.

In order to provide a coupling connecting the lubricant pump to the machine shaft and which will not transmit axial thrust, it is necessary to provide for a sliding motion between the parts of the coupling. This requires that the coupling be continually fed by oil to obtain the low sliding friction necessary to prevent the transmission of end thrust and to prevent excessive wear of its relatively sliding parts. Because the coupling is located at the inlet, or low pressure, side of the external cooling fan, the lubricant, under the influence of its normal tendency to creep along the surface of the shaft and under the influence of the positive pressure head imposed on the lubricant by the low pressure at the inlet side of the fan, tends to become entrained in the air stream of the external cooling air of the motor where it contacts and adheres to the surfaces of the air passages. Under such conditions, dust or other particles which are also entrained in the cooling air cause the cooling surfaces to become so heavily coated that the cooling of the motor is drastically reduced. Satisfactory shaft seals to prevent this entrainment of the oil in the external air stream have not heretofore been available and thus shaft mounted lubricant pumps have not been utilized on totally enclosed dynamoelectric machines.

In accordance with one aspect of this invention, I provide means for overcoming the above problems by providing a seal arrangement including a plurality of lubricant collecting chambers combined with an air pressure chamber adjacent the low pressure side of the fan, to prevent any leakage of lubricant along the rotor shaft and into the external air stream of the motor.

For a more complete understanding of the invention, reference should now be made to the following specification and to the accompanying drawing in which:

Figure 1 is a partial sectional view of a dynamoelectric machine embodying this invention; and Figure 2 is a fragmentary view, partly in section, of the coupling unit between the pump and the rotor shaft of the machine.

Referring now to the drawing, there is shown a dynamoelectric machine, such as a motor, generally indicated by the numeral 1, having a stator frame 2 which is totally enclosed by an end shield 3 which houses the main bearing assembly 4 in which a rotor (not shown) mounted on a shaft 5 is journaled to rotate. Bearing 4 is shown as being a sleeve bearing although it is understood that this invention is equally applicable to a ball or other anti-friction type bearing.

Surrounding the end shield 3 is an external baffle or shell 6 which is provided to direct the external cooling air over the outside of the stator frame 2. A cylindrical outer shell housing may be provided to keep the air in contact with the shell 2 throughout its full length. Air directing vanes 8, here shown as being integrally formed with end shield 3, may be provided to guide the air between the inner and outer shells and to increase the area of the surface presented to the air stream. Mounted to rotate with shaft 5 is cooling fan 9 which discharges air over the shell 2 of the machine as indicated by the arrows 9a. A cylindrical baffle 10 surrounding the outer periphery of fan 9 prevents recirculation of the air between the inlet and outlet sides of the fan.

As hereinbefore stated, the bearings 4 require that a lubricant be pressure fed thereto. Such lubricant is supplied by a pump 11 having an inlet 12 extending from a reservoir 13, and an outlet 14 is arranged for connection with bearing 4 in any suitable manner (not shown). Discharge line 14' returns oil from the bearing to reservoir 13. The pump 11 is provided with a shaft 15 which is driven through a coupling 16 by a shaft stub 17 secured to the end of shaft 5 by any suitable means, as by bolts 18.

As hereinbefore explained, the rotor shaft 5 may move axially as much as ½" for example, during operation, and since pump 11 cannot withstand the end thrust of the rotor under such conditions, coupling 16 is required to provide for relative axial movement between shaft stub 17 and pump shaft 15. Coupling 16 comprises a pair of peripherally splined discs 19 and 20 which are respectively secured to shafts 15 and 17 and form a splined connection with the internal splines of ring 21. Because of the sliding movement between the splines of parts 19, 20 and 21 of the coupling, a lubricant passageway 22 in pump shaft 15 is provided for supplying positive lubrication to these relatively slideable parts of the coupling 16 during operation.

Referring more particularly to Figure 1, it will be noted that the shell 6 is provided with radial arms 23 which are shown as being integral with a housing 24 on which the pump 11 is mounted. A cavity 25 within the housing 24 serves as a basin to catch the overflow oil which is pumped through passageway 22 to lubricate the coupling and to return it to the reservoir through tube 26. However, because of the tendency of oil to adhere to the surface of the shaft 5 and shaft stub 17, some of the oil will creep along the surface of these parts toward the fan 9.

As the oil creeps along shaft stub 17, a certain amount will be thrown outwardly therefrom at point 26 against walls of the cavity 25 and will run along the housing wall 27 to the bottom thereof and re-enter the reservoir through tube 26.

The seal assembly 28, which forms an essential part of this invention, is mounted in the housing 24 between the coupling 16 and the fan 9. It is provided with an end portion 29 having a lip 30 which forms a gutter tending to prevent any oil flowing along the inner surfaces of cavity 25 along the shaft 5. Axially positioned toward the fan from end portion 29 is a series of grooves and rings 31 which further assist in preventing the passage of oil axially. The seal is further provided with a multi-chamber arrangement, here shown as comprising three chambers 32, 33 and 34. At the point where the shaft is positioned within chamber 32, it is provided with a re-entrant groove shown by the dotted line 35, the lips 36 of which serve to sling the oil from the shaft at this point. It will be noted that chamber 32 is provided with an outlet passage 37 through which the oil captured therein is discharged into the cavity 25 for delivery to the reservoir 13. A slinger 38 formed on shaft 5 is likewise provided in chamber 33 and captured oil is similarly conducted through part 39 to the reservoir.

However, the plurality of chambers 32 and 33 are not completely effective in preventing oil leakage and creepage along shaft 5 toward the inlet, or low pressure side of fan 9. In order to prevent any oil from flowing beyond the seal assembly 28, I provide a connection between the pressure side of fan 10 and the chamber 34. As shown, a tube 40 provides connection between these points through an aperture 41 in the baffle 10 and passageway 42 in the seal 28 which is in communication with chamber 34. By providing this pressure to the seal 28, not only is the pressure head at the inlet side of the fan overcome, but a positive pressure is provided in chamber 34 to develop a pressure head in the opposite direction thereby tending to cause the oil to flow away from the fan 9.

From the foregoing, it is apparent that I have provided a directly mounted and driven lubricant pump assembly for lubricating and cooling the bearings of a dynamoelectric machine in an arrangement in which axial movements of the rotor shaft under operating conditions are provided for, and in which lubricant leakage into the external cooling passages of a totally enclosed dynamoelectric machine is avoided. While the specific embodiment disclosed herein has been directed to a dynamoelectric machine, I intend the invention to be equally applicable to any type of machine having a rotating body which provides thrust during operation, and which is of a size requiring forced lubrication of bearings supporting the rotating body, as in a turbine, for example.

While there has been illustrated and described a particular embodiment of this invention, modifications thereof will occur to those skilled in the art. It is to be understood therefore that this invention is not limited to the particular arrangement shown and described and that the appending claims cover all modifications which do not depart from the spirit and scope of the invention.

What I claim as new and desire to secure by Letters Patent of the United States is:

1. In combination, a dynamoelectric machine comprising a casing and a rotatable member having a shaft subject to axial movement, fan means mounted on said shaft externally of said casing for providing a current of cooling air over said casing, a shaft-mounted lubricant pump positioned axially of said fan at a point more remote than said fan from said casing, coupling means mechanically connecting said pump to said shaft to drive said pump, said coupling means being constructed and arranged to prevent the transmission of end thrust therethrough, means for lubricating said coupling means, and means for preventing the lubricant supplied to said coupling means from creeping along said shaft toward said fan means, said last named means comprising a housing around said shaft and having a plurality of lubricant capturing chambers therein and at least one chamber adjacent said fan means in communication with air current at the output side of said fan to provide an air pressure in said last-mentioned chamber greater than the pressure in the adjacent lubricant capturing chamber for preventing lubricant creepage along said shaft toward said fan.

2. A device as recited in claim 1 wherein the portion of the shaft within said lubricant capturing chambers is provided with slinger means for throwing the lubricant thereon against walls of said chamber, said lubricant capturing chambers being provided with lubricant discharge means.

3. A dynamoelectric machine comprising a casing and rotatable member having a shaft subject to axial oscillations, a fan mounted on said shaft externally of said casing for providing a current of air over said casing, a shaft-mounted lubricant pump positioned axially of said fan remote from said casing, coupling means comprising a pair of slideable elements having a common spline connection for connecting said pump to said shaft for rotation therewith, means for lubricating said coupling means, and means for preventing the coupling lubricant from creeping along said shaft toward said fan, said last named means comprising a seal member around said shaft and having a plurality of lubricant capturing chambers and at least one chamber in communication with the output air stream of said fan to provide an air pressure head therein for forcing the lubricant on said shaft away from said fan.

4. A dynamoelectric machine comprising a casing and a rotatable member having a shaft subject to axial movement, a fan mounted on said shaft externally of said casing for providing a current of cooling air over said casing, a baffle surrounding said fan and spaced from said casing and defining therewith a path for the cooling air, a shaft driven lubricating pump mounted on said baffle for providing lubricant to said machine, a coupling means mechanically connecting said pump to said shaft to drive said pump, said coupling means being constructed and arranged to prevent end thrust of said rotatable member from being transmitted to said pump, said pump being provided with an auxiliary outlet for lubricating said coupling means, and a seal member positioned between said coupling member and said fan, said seal member having a lubricant capturing chamber and an air pressure chamber at its end adjacent said fan, said air pressure chamber being connected to receive air pressure from the output of said fan to prevent the low pressure occurring in the region between the seal member and the fan from drawing lubricant into the cooling air.

References Cited in the file of this patent

UNITED STATES PATENTS

| | | |
|---|---|---|
| 1,057,386 | Tingley | Mar. 25, 1913 |
| 1,595,381 | Christensen | Aug. 10, 1926 |
| 1,840,127 | Penney | Jan. 5, 1932 |
| 1,905,234 | Labberton | Apr. 25, 1933 |
| 2,234,777 | Puffer | Mar. 11, 1941 |